May 31, 1938. G. B. BURNSIDE 2,119,379
AIR HEATING APPARATUS
Filed Feb. 24, 1937  2 Sheets-Sheet 1
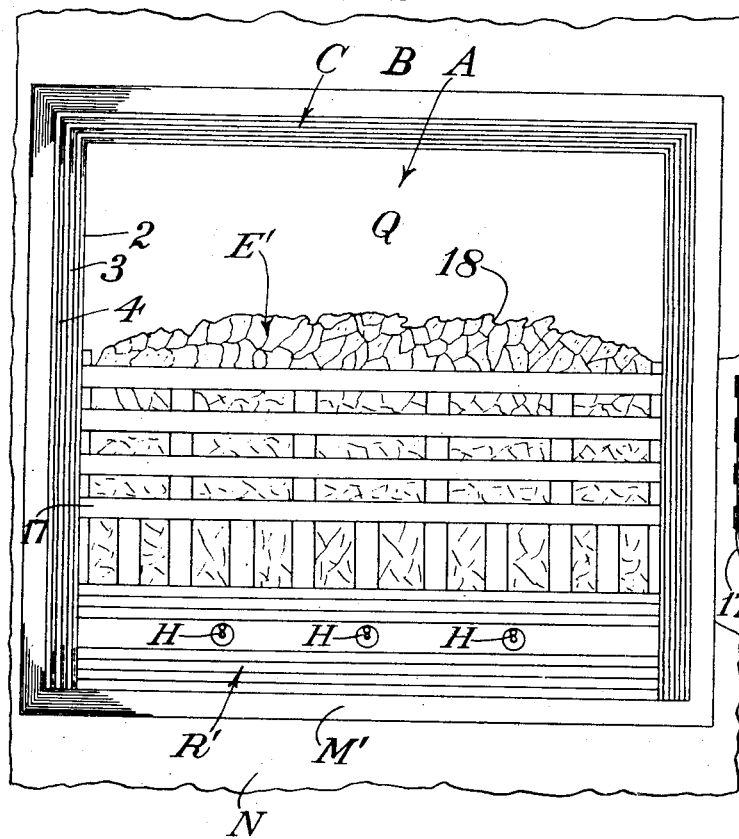
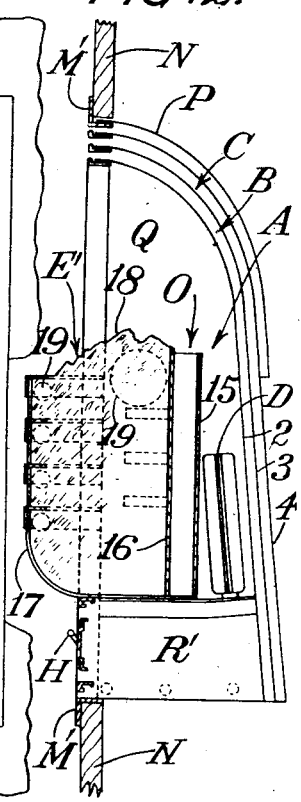
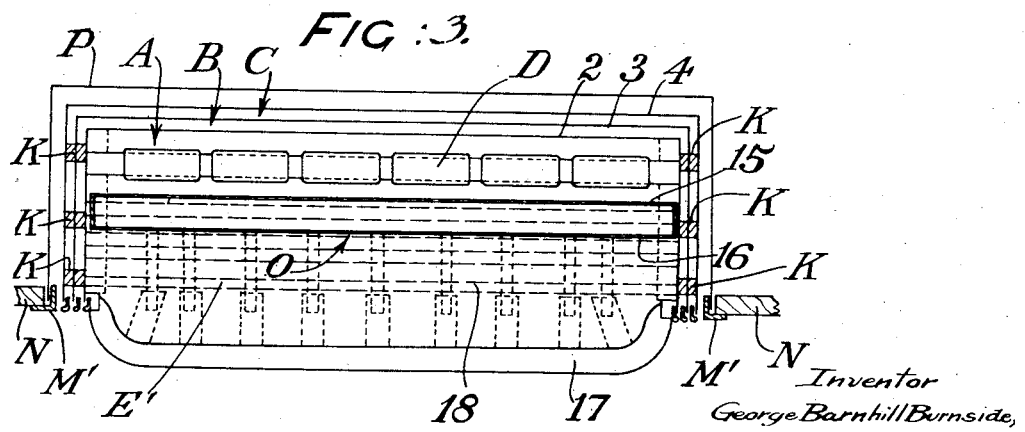
Inventor
George Barnhill Burnside,
By Ritter, Machlin, O'Neill &  
Attorneys

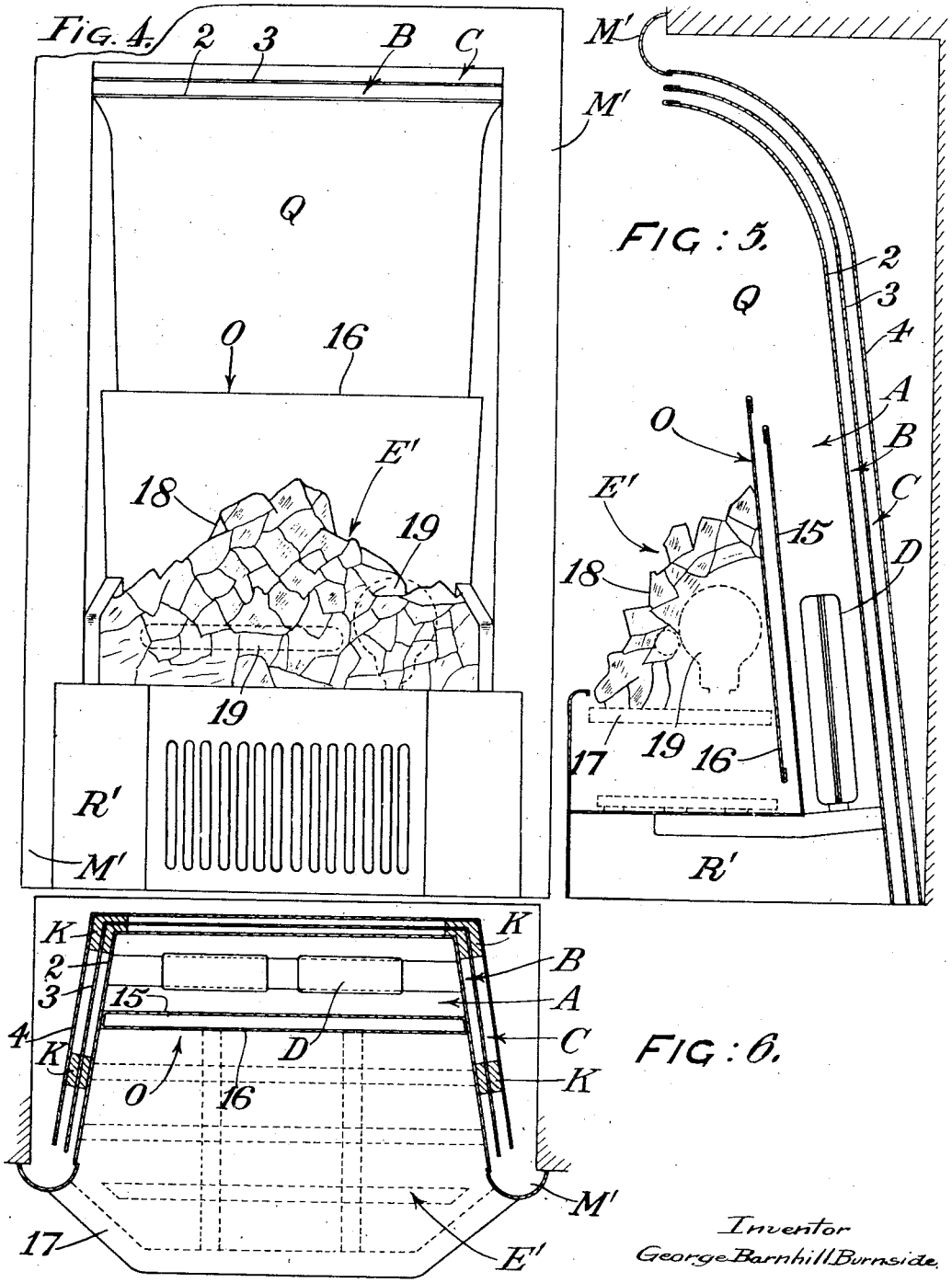

Patented May 31, 1938

2,119,379

UNITED STATES PATENT OFFICE 2,119,379

AIR HEATING APPARATUS

George Barnhill Burnside, Fairhill, Dullatur, Scotland

Application February 24, 1937, Serial No. 127,533
In Great Britain August 8, 1935

1 Claim. (Cl. 219—34)

This invention relates to air heating apparatus, particularly for the purpose of heating apartments or rooms in buildings, ships' cabins, compartments of vehicles and the like, of the heating and auxiliary duct type, that is, the type wherein the air to be heated passes through a duct, hereinafter referred to as the heating duct, within which is situated a heating element for heating the air and at the outside of which heating duct an auxiliary duct (or ducts) is formed for auxiliary air to flow through which in flowing acquires heat from the wall of the heating duct and passes to discharge with the air from the heating duct, the auxiliary duct (or ducts) acting to reduce the emission of radiant heat from the apparatus, the delivery of heat in this type of apparatus being principally by convection through the medium of the discharge of heated air, emission of heat from the apparatus by radiation and conduction generally representing a loss in efficiency and being as far as possible eliminated.

The invention is concerned with air heating apparatus in which provision is made for producing luminous effects by lamp illumination, the heating element of the apparatus itself being non-luminous, or, if luminous, not being visible.

The invention deals generally with the question of loss of heat by radiation or conduction, its object broadly being to provide for the conservation of heat so that it may be delivered to the room or the like through the medium of the heated air and so that heat should appear to emanate from illumination means.

The invention also deals with conditions where delivery of the heated air is to be through an opening in material which in the vicinity of that opening should not become unduly heated, for example, where delivery is through an opening in wood panelling of a room or of a ship's cabin, or in a wood casing within which the heating apparatus is housed, and for such conditions the invention has for another of its objects the reduction of transmission of heat by conduction to the surrounding material in that vicinity.

According to this invention, air heating apparatus of the heating and auxiliary duct type is provided, comprising an upwardly extending heating duct arranged to deliver heated air forwardly, a heating element situated within the heating duct for heating the air, an auxiliary duct (or ducts) outside the heating duct for auxiliary air to flow through, the auxiliary duct extending over the sides, back and upper part of the heating duct but being open at the front to present at the front an insulating space all round the sides and the upper heated part of the heating duct, and, situated at the front of the heating duct below the delivery outlet thereof, luminous means arranged so that the light from the luminous means is directed forwardly and upwardly and the heated air from the heating duct is caused to issue over the luminous means so that the heat delivered by the air appears to come from the luminous means, which may comprise imitation coal fuel with an illuminating lamp or lamps.

Some examples of electrical air heating apparatus in accordance with the invention will now be described with reference to the accompanying drawings, in which:—

Figure 1 is a front view, Figure 2 is a side sectional view, and Figure 3 is a sectional plan view, showing one example, and Figure 4 is a front view, Figure 5 is a side sectional view, and Figure 6 is a sectional plan view showing another example.

The heating apparatus shown in Figures 1, 2 and 3 is constructed to resemble an interior grate having a fire place of the bar type, the apparatus comprising a heating duct A having within it electric heating elements D, two auxiliary ducts B and C, and an imitation coal fire E'. About midway between the front and the back of the duct wall 2 a partition O extends in an approximately vertical plane from side to side of that wall, this partition O forming with the back and sides of the wall 2 the heating duct A. The partition O comprises two parallel walls 15 and 16 spaced apart so as to form a supplementary air duct. In front of partition O a delivery cavity Q is left of approximately the shape and size of the fireplace of an interior grate, say about 2 feet 8 inches broad and 2 feet 6 inches high. The front edges of the three walls 2, 3 and 4 are in approximately one and the same vertical plane, the plane of air delivery, and the walls are connected together at the lower ends only, by parts K. The imitation coal fire E' is within a grate 17 of the bar type, and comprises imitation fuel 18 which is piled up to about the top of the partition O, and lamps 19 embedded in the fuel. Below the imitation fire E' is an imitation ash box R' through which inlet of cold air to the duct A takes place. Switches H for the regulation of heating are mounted on the front of the imitation ash box. A heat shield P is provided outside the wall 4 at its upper part where the heating effect is strong. The duct structure is mounted in a frame M'.

For use, the apparatus is set into wall panelling N or into a recess in a wall or enclosed in a casing, say of wood. The principal discharge of heated air is forwardly and upwardly from immediately above and behind the imitation fire, so that to a person in front of the heating apparatus the heat appears to be emanating from the imitation fire. Air to be heated is drawn in through the imitation ash box and also at the lower front side parts of the ducts B and C.

The example shown in Figures 4, 5 and 6 is constructed to resemble an interior grate with a bar-less fire, the construction being substantially the same as that described with reference to Figures 1, 2 and 3.

It will be understood that, while the invention is principally applicable to electrical heating apparatus, heating means other than electrical may be used, such as steam or hot water heating means.

I claim:—

Air heating apparatus comprising an upwardly extending heating duct arranged to deliver heated air forwardly, a heating element disposed within the heating duct for heating the air, an auxiliary duct outside the heating duct for auxiliary air to flow through, the auxiliary duct extending over the sides, back and upper part of the heating duct and being open at the front to present an insulating space all around the sides and the upper heated part of the heating duct, imitation coal fuel over which heated air from the heating duct passes, said imitation coal being situated at the front of the heating duct below and closely adjacent to the delivery outlet thereof and between the sides of the auxiliary duct, lamp illumination in the imitation coal for directing light upwardly and forwardly therefrom, and an additional air duct interposed between the heating element and the imitation coal.

GEO. B. BURNSIDE.